United States Patent Office 3,410,181
Patented Nov. 12, 1968

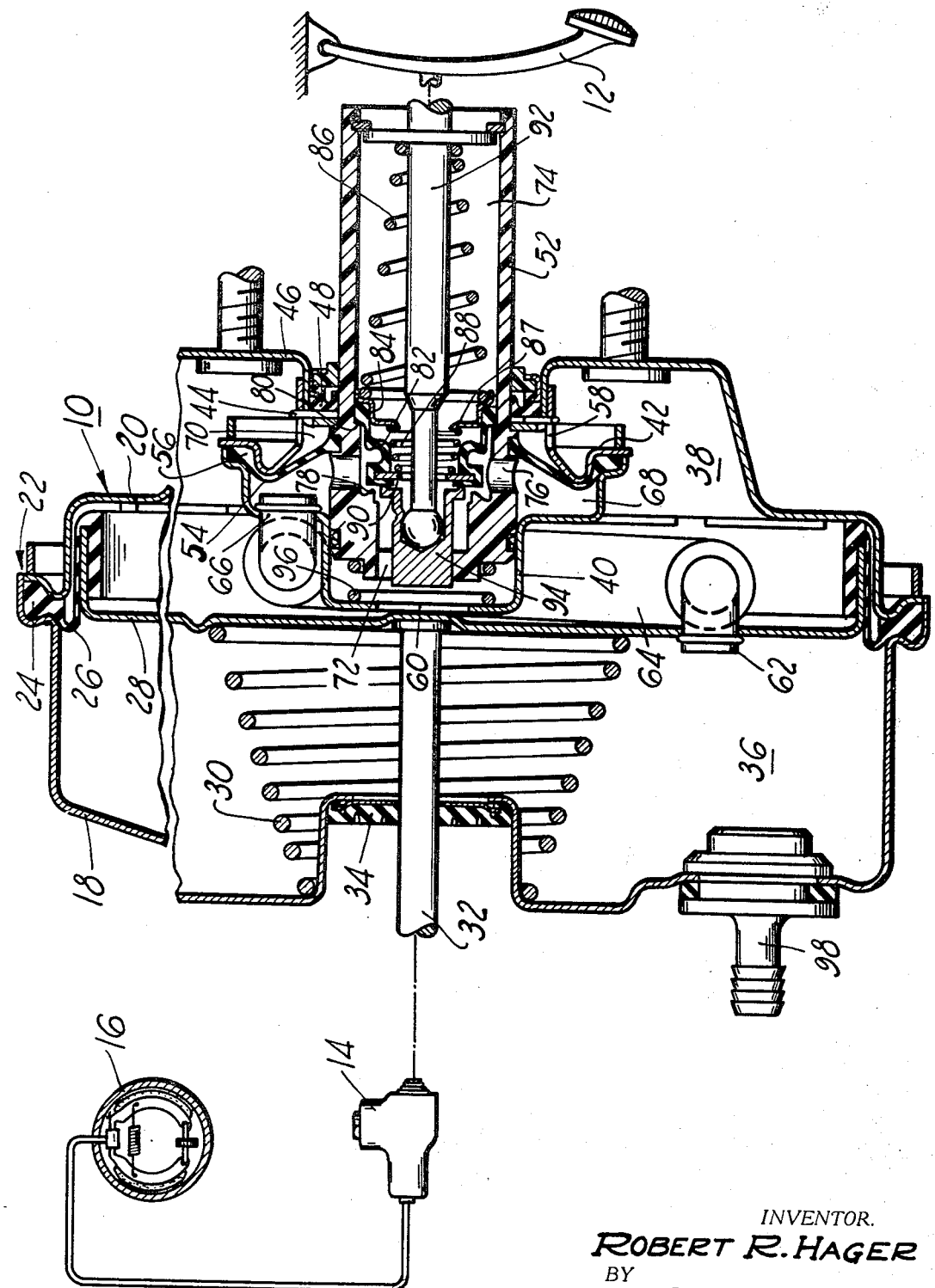

3,410,181
POSITION RESPONSIVE SERVOMOTOR
Robert R. Hager, South Bend, Ind., assignor to The
Bendix Corporation, a corporation of Delaware
Filed Dec. 16, 1966, Ser. No. 602,396
5 Claims. (Cl. 91—434)

ABSTRACT OF THE DISCLOSURE

This invention relates to a fluid pressure servomotor having a valve means which is sensitive to the pressure responsive across a movable wall in the servomotor to position an operator-operated control member in accordance with the position of the movable wall to render same travel responsive so that the operator of the servomotor will sense the travel required to perform work by the servomotor.

Summary

Prior to this invention fluid pressure servomotor of the type which it is concerned were graduated against a force with the travel of the controlling member or stroke, as it may be termed, being indicative of displacement requirements for performing the desired work. It is a principal object of this invention to provide such a servomotor with a means to sense the travel of the working member of the servomotor rather than the force it is generating to enable the operator thereof to more readily observe the approach of power run-out of such a servomotor.

Drawing description

The single figure of the drawing shows a fluid pressure servomotor in cross section as may be utilized with a vehicle braking system shown in schematic form.

Detailed description

More particularly, there is shown a fluid pressure servomotor 10 operated by a brake pedal 12 to generate a pressure in a master cylinder 14 for actuation of wheel brakes 16.

The servomotor 10 is constructed by joining a forward shell 18 to a rearward shell 20 as at 22 with a peripheral bead 24 of a rolling diaphragm 26 interposed to seal the juncture of the shells and thereby form a housing with an internal axially extending chamber. The diaphragm 26 also is connected to a movable wall 28 that is arranged within the internal chamber and positioned by a return spring 30 between the forward shell 18 and the wall 28. The wall 28 has affixed to it a force transmitting rod 32 which extends through an opening in the forward shell 18 that is sealed by means of a seal 34. Thus the wall divides the internal chamber into a first variable volume portion 36 and a second variable volume portion 38.

However, prior to the assembly of the shells, a valve housing formed from a forward shell 40 and a rearward shell 42 that are joined together similar to the shells 18 and 20 are affixed by means of a retainer key 44 to an inwardly turned flange 46 of the rear shell 20 so that a seal 48 and a bearing ring 50 within the inwardly turned flange 46 slidably support a valve sleeve 52 that is guided within the forward shell 40 of the valve housing. The valve sleeve 52 includes a flexible wall or diaphrgam, as it may be termed, 54 which has peripheral beads 56 between the juncture of the shells 40 and 42 to seal the same. In addition, the valve housing is provided with an inlet passage 58 and an outlet passage 60 which communicate with the variable volume portion 38 behind the movable wall 28. The movable wall 28 is provided with a tubular fitting 62 to which is connected a rubber hose 64 that leads to a similar tubular fitting 66 that opens into the forward shell 40 of the valve housing thereby communicating the variable volume portion 36 to a variable volume chamber 68 whereas the passage 58 communicates the variable volume portion 38 to a variable volume chamber 70 on the other side of the diaphragm 54 within the valve housing.

The valve sleeve is provided with an axially extending internal chamber opening on both ends, as at 72 and 74, and has a radial group of passages 76. The sleeve is formed to have a valve seat 78 forward of the radial group of passages 76 between the communication of these passages with the open ends 74 of the sleeve 52. A shoulder 80 is formed in the sleeve on the other side of these passages. An annular, flexible poppet valve 82 is held against the shoulder by means of a retainer 84 positioned by a return spring 86. The retainer has a depending flange 87 retaining a valve follow-up spring 88 that is biased between a reinforcing ring 90 carried by the flexible poppet 82 and the retainer 84. Passing internally of the flexible poppet 82 is a control rod 92 having a valve seat member 94 affixed to its forward end and normally holding the flexible poppet 82, due to the return spring 86, away from the valve seat 78 whereby the radial passages 76 communicate with the open end 74 and in turn communicate the chamber 36 via the hose 64 to the chamber 38. Lastly, a biasing spring 96 is inserted about the opening 60 of the valve housing and compressed between a valve sleeve 52 and the shell 40 of the valve housing to normally position the valve sleeve exteriorly of both the valve housing and the servomotor housing in a released attitude.

Operation

Upon depression of the brake pedal 12 the valve seat 94 moves forwardly to permit the poppet 82 to abut on the seat 78 of the valve sleeve 52. In this position the valve is in a lapped condition and the communication of the chamber 36 to the chamber 38 is terminated. It should be noted that the shell 18 is provided with a check valve 98, which for purposes of explaining the operation of this unit is connected to the intake manifold of a vehicle's engine (not shown) so that the movable wall 28 is normally suspended in a vacuum which is terminated by the lapping, as aforementioned, of the valve poppet 82 on the valve seat 78. Further movement of the brake pedal 12 in the leftward direction, as viewed in the drawing, will then displace the valve seat 94 from the forward face of the flexible poppet 82 and permit atmospheric communication from the open end 74 of the valve sleeve 52 to exit via the opening 60 in the shell 40 of the valve housing to the variable volume portion or chamber 38. This will create a pressure differential across the wall 28 to start applying the force transmitting rod 32 to pressurize the master cylinder 14 and thereby create braking in the wheel brakes 16. At the same time the vacuum is still in the chamber 68 of the valve housing and the pressure in the chamber 38 is communicated via the passage 58 to the chamber 70 of the valve housing to create an equal pressure differential across the diaphragm 54, as exists across the wall 28. Thus the valve sleeve 52 will move inwardly in opposition to the spring 96 to permit the poppet 82 to again abut on the valve seat member 94.

It should be appreciated that during any application below vacuum run-out, the wall 28 will stroke independent of the valve. Above run-out, the control rod 92 and its valve seat, which could be said to from a valve plunger, will leave the poppet 82 and sleeve 52 behind and will stroke down to the wall 28 so that additional force can be applied directly to the master cylinder via the force transmitting rod 32. It will be appreciated by those skilled in the art that actually, manual feel only starts at vacuum run-out.

It may thus be realized that while past valves have required a driver of a vehicle to balance the reaction force in the servomotor to thereby find valve lap with his foot, the valve of the subject invention utilizes the pressure differential within the servomotor to lap the valves in accordance with the travel of the brake pedal under the control of the vehicle operator. This has a distinct advantage of providing a very rapid operation of the servomotor, which, in considering its use for power braking, means more rapid deceleration can be achieved with increased stroke of the brake pedal. Conversely, if the driver senses he is decelerating too fast, he need only let off the pedal slightly which will port vacuum to chambers 38 and 70. Upon a decrease of the pressure differential across diaphragm 54, spring 96 pushes the sleeve back until it balances force across the diaphragm to achieve a new valve lap position and similarly spring 30 will move wall 28 to retract rod 32 and decrease master cylinder pressure to the brakes.

Having fully accomplished the objects of the invention it is now desired to set forth the protection sought by the following claims.

I claim:
1. A fluid pressure device comprising:
   a servomotor housing having an internal axially extending chamber therein;
   a fixed valve housing within said chamber and opening exteriorly of said servomotor housing;
   a valve means within said valve housing, said valve means including,
      a valve sleeve supported by said valve housing,
      a diaphragm mounted between said valve housing and said valve sleeve to render said valve housing pressure responsive,
      a valve poppet within said valve sleeve,
      an operator-operated valve seat movably supported by said valve sleeve ahead of said valve poppet, and
      a spring means for biasing said valve sleeve and said operator-operated valve seat to project from said servomotor housing while abutting said poppet and seat in a released attitude; and
   a movable wall in said chamber operatively controlled by the valve means to deliver a force upon the creation of a pressure differential scheduled by the valve means across the movable wall, said movable wall including a means operatively connected to said movable wall and said valve housing for providing a pressure differential across said diaphragm between said valve housing and said valve sleeve to position said valve sleeve in accordance with the pressure differential across said movable wall whereby said sleeve is moved inwardly to abut said poppet and said seat and control of said operator-operated valve seat is responsive to the travel of said movable wall.

2. In a fluid pressure servomotor having a movable wall dividing an internal chamber of a housing into first and second variable volume portions, a travel responsive valve means comprising:
   a fixed valve housing in said second variable volume chamber, said fixed valve housing having an inlet passage and an outlet passage communicated with said second variable volume chamber;
   a spring biased valve sleeve in said valve housing having an axially extending internal valve chamber therein and having radial and axial passage means;
   a valve poppet within said axially extending internal valve chamber for controlling communication of said radial passage means via a valve seat formed with said valve sleeve to one of said axial passage means or to communicate another axial passage means with said one axial passage means;
   an operator-operated control means for controlling said valve poppet; and
   a conduit means communicating said first variable volume chamber to said valve housing to position said valve sleeve in accordance with the pressure differential across said movable wall of said servomotor.

3. A fluid pressure servomotor comprising:
   a housing having an internal axially extending chamber therein;
   a movable wall in said chamber dividing same into first and second variable volume portions;
   a force transmitting rod on the forward side of said wall;
   a valve housing affixed to said housing of said servomotor;
   a valve sleeve mounted by a flexible wall to said valve housing to be slidable axially in said valve housing in the same direction as said movable wall, said valve sleeve axially extending through adjacent ends of said housing and said valve housing, said flexible wall dividing said valve housing into first and second variable volume chambers and means communicating said second variable volume portion to said first and second variable volume chambers;
   an annular flexible poppet in said sleeve between an inlet passage and an outlet passage thereof and said means communicating said first variable volume chamber to said second variable volume portion;
   means communicating said first variable volume portion to said first variable volume chamber;
   an operator-operated control member for positioning said annular flexible poppet and selecting whether said first variable volume chamber or a fluid power source is communicated to said second variable volume portion of said internal chamber of said housing to suspend said movable and flexible walls in the common pressure or create a pressure differential of equal magnitude across same; and
   means in absence of a pressure differential to position said movable wall in said valve sleeve toward the rear of said housing in a released attitude.

4. A servomotor in accordance with claim 3 wherein said means positioning said movable wall and said valve sleeve includes a first spring between said housing and said movable wall and a second spring between said valve housing and said valve sleeve.

5. The structure of claim 2 wherein said operator-operated control means is arranged to manually actuate said movable wall in event of power insufficiency.

References Cited
UNITED STATES PATENTS

| | | | |
|---|---|---|---|
| 3,075,499 | 1/1963 | Prather | 91—434 |
| 3,188,920 | 6/1965 | Hager | 91—434 |
| 3,352,209 | 11/1967 | Cripe | 91—434 |

PAUL E. MASLOUSKY, *Primary Examiner.*